United States Patent [19]

Szentesi

[11] Patent Number: 4,714,317
[45] Date of Patent: Dec. 22, 1987

[54] BICONIC OPTICAL FIBER CONNECTOR/ATTENUATOR

[75] Inventor: Otto I. Szentesi, Hickory, N.C.
[73] Assignee: Siecor Corporation, Hickory, N.C.
[21] Appl. No.: 851,463
[22] Filed: Apr. 14, 1986
[51] Int. Cl.[4] .............................................. G02B 6/36
[52] U.S. Cl. ............................ 350/96.21; 350/96.20
[58] Field of Search ............... 350/96.10, 96.15, 96.20, 350/96.21, 96.22

[56] References Cited

U.S. PATENT DOCUMENTS

| | | | |
|---|---|---|---|
| 4,107,242 | 8/1978 | Runge | 350/96.20 X |
| 4,145,110 | 4/1979 | Szentesi | 350/96.15 |
| 4,213,932 | 7/1980 | Young | 264/236 |
| 4,240,695 | 12/1980 | Evans | 350/96.21 |
| 4,264,128 | 4/1981 | Young | 350/96.20 |
| 4,440,471 | 4/1984 | Knowles | 350/96.20 |
| 4,458,983 | 7/1984 | Roberts | 350/96.20 |
| 4,512,630 | 4/1985 | Runge | 350/96.21 |
| 4,519,671 | 7/1985 | Lyn | 350/96.15 |
| 4,529,262 | 1/1985 | Ashkin | 350/96.15 |

Primary Examiner—William L. Sikes
Assistant Examiner—Akm E. Ullah
Attorney, Agent, or Firm—Roy B. Moffitt

[57] ABSTRACT

A biconic optical fiber connector adapted to introduce in an optical fiber transmission line a predetermined amount of attenuation comprising: a frustroconical shaped male and socket member adapted to be fitted into one another, a first optical fiber having a free end disposed in and terminated on a surface of the frustroconical shaped male member and a second optical fiber in alignment with the first optical fiber having a free end disposed and terminated in the socket. A shim or sleeve with an aperture having inside and outside frustroconical surfaces delimiting a predetermined wall thickness between them disposed over the frustroconical member and between the socket and frustroconical male member, the wall thickness of the shim causing the free ends of the first and second optical fibers to be separated one from another a predetermined distance so as to introduce into the optical fiber transmission line a predetermined amount of attenuation that is a function of the shim's wall thickness.

3 Claims, 8 Drawing Figures

BICONIC OPTICAL FIBER CONNECTOR/ATTENUATOR

BACKGROUND OF THE INVENTION

Attenuators are often required in an optical fiber transmission path to reduce the strength of an incoming signal to a desired level. Generally, the required attenuation is induced at a patch panel or a patch board because it is at this point that attenuators can be most conveniently inserted between mated connectors. For example, the prior art biconic connector disclosed in U.S. Pat. No. 4,213,932 employs a cylindrical shaped attenuator insert to space apart terminal free ends of two different optical fibers, thereby creating a "gap-loss" type of attenuation of the signal sought to be reduced in strength. In this prior art type attenuator, the attenuation is "molded in" and affixed to a receiving socket that has to be screwed into and out of a bulk head or a build out barrel, diminishing the flexibility of the connector, i.e., making it difficult to quickly change the value of the attenuator.

The disclosed invention employs the use of a removable low-loss, low-cost, frustroconical shaped shim or sleeve of a predetermined wall thickness in combination with conventional prior art biconic type connectors, and can be used regardless whether the incoming line is a bulk head feed through, or a built out variety. Once inserted, the attenuating shim or sleeve can be easily and readily removed or replaced with another. Consequently, an incoming line may be easily converted to a low loss situation and then converted back or then again changed to another predetermined loss with ease and speed.

SUMMARY OF THE INVENTION

The disclosed invention is basically a biconic optical fiber connector that induces into an optical fiber transmission line a predetermined amount of attenuation. The connector is composed of several parts, namely a male member having a frustroconical shaped portion in which there is a first optical fiber having a free end. There is also a frustroconical shaped socket in which the frustroconical shaped male member is adapted to be fitted into, the socket containing a second optical fiber with a free end. The free end of the first and the second optical fibers are in alignment one with another. To this combination is added a shim or a sleeve. The shim has an aperture and inside and outside frustroconical shaped surfaces delimiting between these surfaces a predetermined wall thickness. This shim is placed over the frustroconical male member portion and then this combination is fitted inside of the socket. Depending on and as a function of the wall thickness of the shim, the free ends of the first and second optical fibers are separated one from another a predetermined distance so as to introduce in the optical fiber transmission line a predetermined amount of attenuation that is a direct function of the wall thickness of the shim or sleeve, not the length of the shim or sleeve as with prior art types.

DETAILED DESCRIPTION OF THE INVENTION

Figure 1:
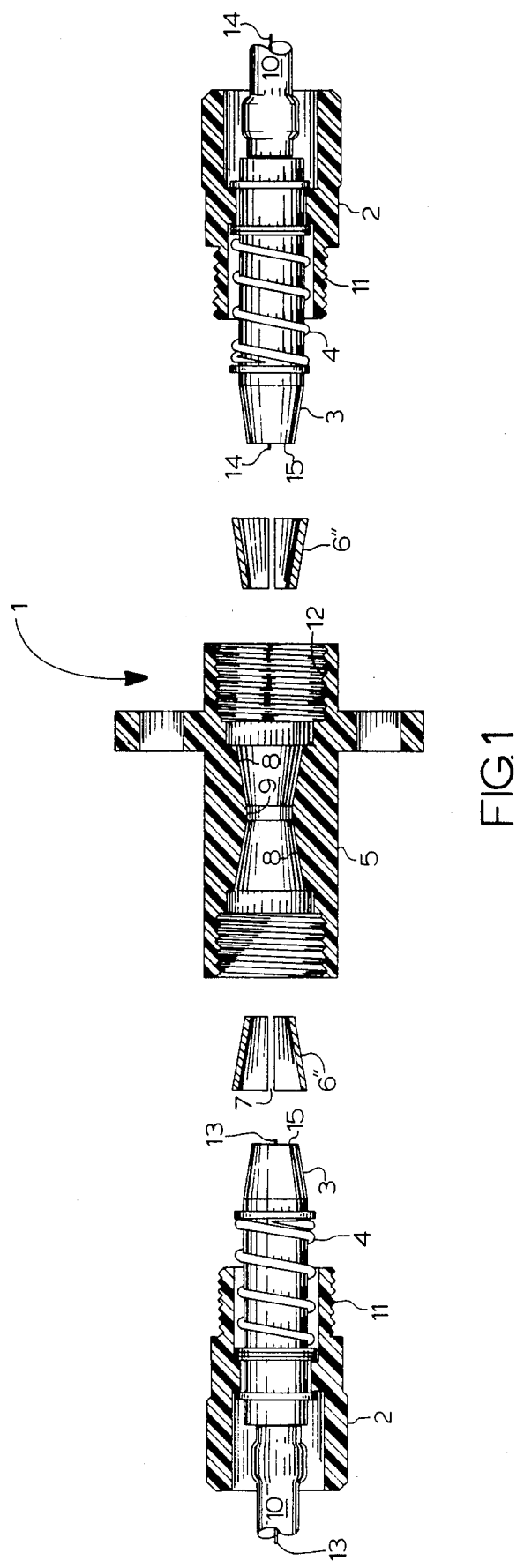
FIG. 1 is an exploded cross sectional view of the biconic optical fiber connector of the invention.

Referring to element 1 of FIG. 1, there is shown an exploded cross-sectional view of the component parts of the invention. Element 2 is a plastic housing having a threaded portion 11 adapted to be screwed into threaded portion 12 of receiver 5. In plastic housing 2, there is disposed a male member 3 that has a frustroconical shape terminal portion. Male member 3 (lefthand portion of FIG. 1) contains first optical fiber 14, which has a terminal free end coinciding with terminal free surface 15 of the frustroconical shaped terminal portion of male member 3. In the righthand portion of FIG. 1, second optical fiber 13 is similarly disposed in like elements as previously described for element 14. It will be noted that the structure of the lefthand portion of FIG. 1 is essentially the same as that of the righthand portion of FIG. 1 and except as noted, like elements have like element numbers. Each male member 3 also has disposed around it a spring 4 causing the frustroconical terminal portion of male member 3 to fit snugly into socket 8 of receiver 5, which has an interior sidewall also frustroconical shaped and thus adapted to receive the frustroconical shaped terminal portion of male member 3.

Figure 4:
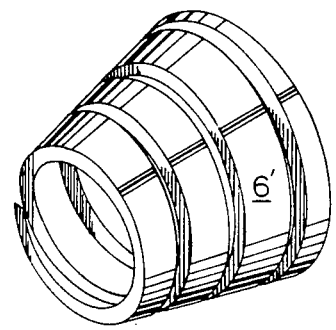
Figure 3:
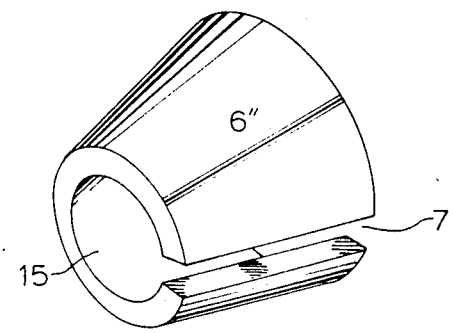

Shim 6" is made of any suitable plastic or metal (such as anodized aluminum), may have a slot 7 in the sidewall, (a slot is not necessary, but is helpful) or is made from a helically wound elongated member, e.g., a spring (note FIG. 4). The exterior and interior surface of shim 6 is frustroconical in shape, such surfaces delimiting a predetermined wall thickness the function of which will be described later. Shim 6" is adapted to be placed over the terminal portion of the frustroconical portion of element 3 and to be seated inside of the side walls of socket 8, all of which can be readily seen in FIG. 2. Element 10 is a plastic coating or sheath over optical fibers 13, 14.

Figure 2:
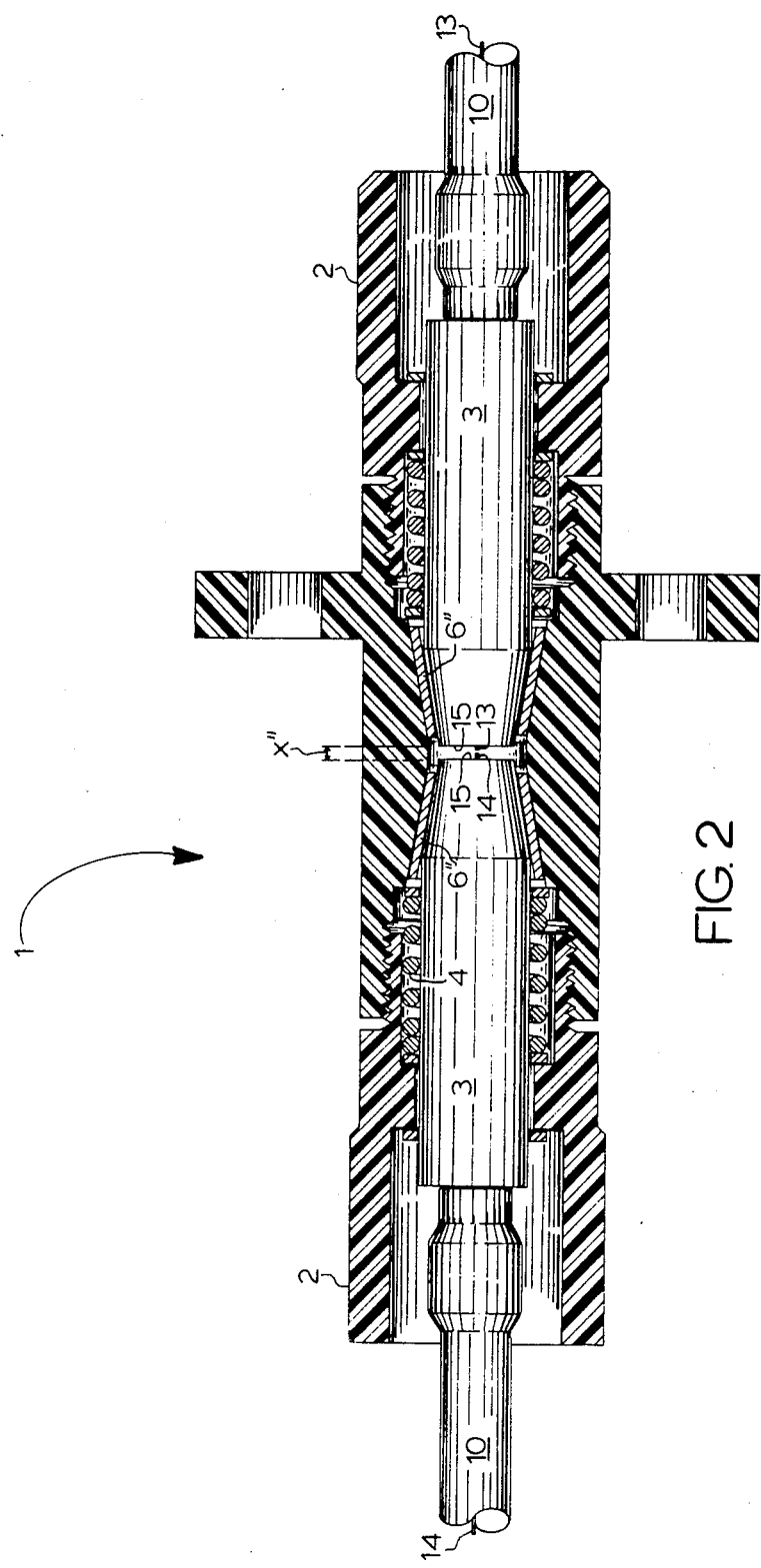
FIG. 2 is a cross sectional view of the piece parts of FIG. 2 assembled into their intended combination.
Figure 5:
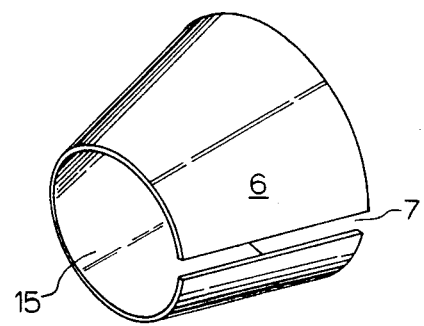
FIGS. 3, 4, and 5 are perpective views of different sizes and kinds of frustroconical shape shims that may be used in the combination described in FIGS. 1 and 2.
Figure 8:
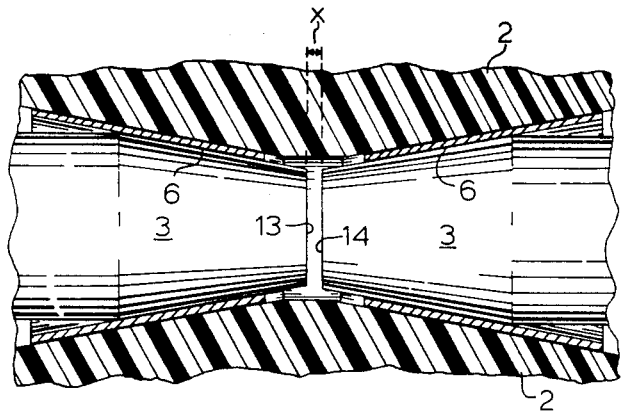
FIGS. 6, 7, and 8 are partial exploded parts of the assembly of figures describing the effect that different size shims of FIGS. 3, 4, and 5 respectively have on the other members of the assembled invention.
Figure 7:
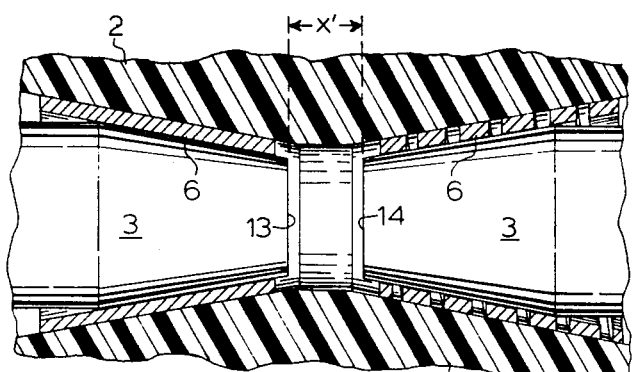
Figure 6:
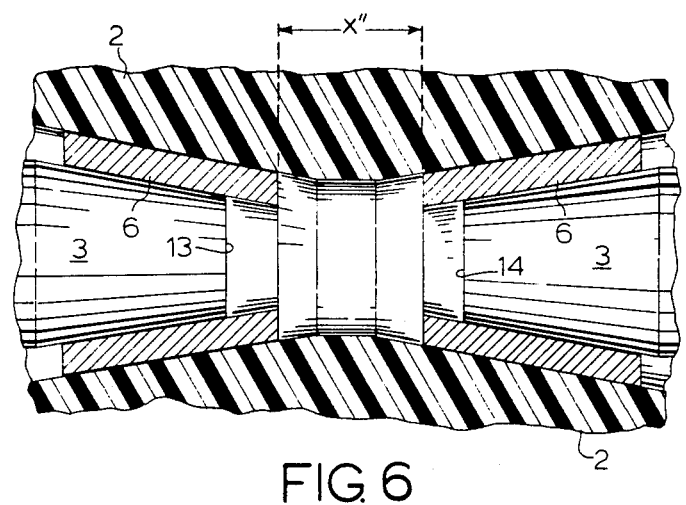

Viewing FIG. 2, the assembled components of FIG. 1, one can readily realize that terminal free ends of optical fibers 13 and 14 are spaced apart a predetermined distance X" arising out of the wall thickness of shim 6". Note in this connection FIG. 6. Without shim 6, 6', or 6", disposed in the assembled apparatus as shown in FIG. 2, free surfaces 15 of the diametrically opposed male members 3 would essentially be flush with one another and the optical fiber free ends of optical fibers 14 and 13 would be in essentially abutting relationship. In such a configuration, the attenuation attributable to the splice between optical fibers 13 and 14 would be at its lowest level. As free surfaces 15 increase in their distance one from another (X, X', or X") the introduced attenuation is increased progressively, note FIGS. 8, 7, and 5 respectively. Thus, it can be readily seen that the thicker the shim wall the greater the distance terminal free end on optical fiber 13 and 14 are spaced one from another. The greater the space, the greater the attenuation. Compare FIG. 6 with FIGS. 7 and 8.

Slot 7 (optional) of shim 6 and 6" causes a gripping action when the shim is installed and also functions to allow movement to accommodate a small cone angle variation. With a slot, Shim 6 or 6" has first, second, third and fourth free edges. Such gripping action comes about as a result of slot 7 being forced open when the attenuator 6 and 6" is placed onto the frustroconical terminal portion of member 3. Shims 6 or 6" could also be a helical member made out of wire (an elongated member) having a predetermined thickness and obviously frustroconical shaped (see FIGS. 4 and 7).

I claim:

1. A biconic optical fiber connector adapted to introduce into an optical fiber transmission line a predetermined amount of attenuation comprising:
   (a) a male member, a portion of which is frustroconical shaped and has a terminal free surface;
   (b) a socket member having a frustroconical shape, adapted to receive the frustroconical shaped portion of the male member;
   (c) a first optical fiber disposed in the male member, having a terminal free end in communication with the terminal free surface of the male member;
   (c) a second optical fiber having a terminal free end, the terminal free end of the first optical fiber being in alignment with and exposed to the terminal free end of the second optical fiber; and,
   (e) a shim with an aperture in it, having outside and inside surfaces delimiting a frustroconical shape and a predetermined wall thickness between them, received in the socket and disposed over the frustroconical portion of the male member, the wall thickness of the shim causing the free ends of the first and second optical fibers to be separated one from another a predetermined distance so as to introduced into an optical fiber transmission line which includes the first and second optical fibers a predetermined amount of attenuation that is a function of the shim's wall thickness.

2. The biconic optical fiber connector of claim 1 wherein the shim has first, second, third, and fourth free edges.

3. The biconic optical fiber connector of claim 1 wherein the shim is a helically wound elongated member.

* * * * *